United States Patent [19]

Shoji et al.

[11] Patent Number: 5,103,303
[45] Date of Patent: Apr. 7, 1992

[54] MULTICOLOR IMAGING FORMING APPARATUS

[75] Inventors: Hisashi Shoji; Satoshi Haneda; Masakazu Fukuchi, all of Hachioji, Japan

[73] Assignee: Konica Corporation, Tokyo, Japan

[21] Appl. No.: 655,246

[22] Filed: Feb. 13, 1991

Related U.S. Application Data

[63] Continuation of Ser. No. 339,520, Apr. 17, 1989, abandoned.

[30] Foreign Application Priority Data

Apr. 19, 1988 [JP] Japan ................. 63-96090
Apr. 19, 1988 [JP] Japan ................. 63-96091
Apr. 19, 1988 [JP] Japan ................. 63-96095
Apr. 19, 1988 [JP] Japan ................. 63-96096

[51] Int. Cl.⁵ .............................. H04N 1/46
[52] U.S. Cl. ........................ 358/75; 358/470
[58] Field of Search .......... 358/448, 460, 296, 300, 358/450, 75, 80, 451, 452, 466, 467, 470; 382/7, 12, 13, 14, 17

[56] References Cited

U.S. PATENT DOCUMENTS

| | | | |
|---|---|---|---|
| 4,568,981 | 2/1986 | Beaulier | 358/22 |
| 4,679,929 | 7/1987 | Haneda et al. | 355/4 |
| 4,707,715 | 11/1987 | Miura et al. | 358/296 |
| 4,829,583 | 5/1989 | Monroe et al. | 352/13 |
| 4,905,091 | 2/1990 | Suzuki et al. | 358/78 |
| 4,914,737 | 4/1990 | Amemiya et al. | 355/276 |
| 4,918,740 | 4/1990 | Ross | 382/13 |

FOREIGN PATENT DOCUMENTS

0322680 7/1989 European Pat. Off. .

Primary Examiner—Jin F. Ng
Assistant Examiner—Jerome Grant, II
Attorney, Agent, or Firm—Frishauf, Holtz, Goodman & Woodward

[57] ABSTRACT

A multicolor image forming apparatus includes an image input means for outputting at least a character, a character size, and character coordinate data on a screen as image code data on the basis of input image data, a font storage section for storing font data and outputting the font data in accordance with an input address signal, a font data conversion sectin having a function of converting the image code data into image data consisting of pixel data on the basis of the font data, and an image buffer memory for temporarily storing the image data output from the font data conversion section. Toner images are frame-sequentially formed in layers on an image forming body in units of color components on the basis of the obtained image data, thereby forming a multicolor toner image.

8 Claims, 11 Drawing Sheets

10: FONT DATA CONVERSION SECTION

FIG. 3

6: ELECTROPHOTOGRAPHIC RECORDING SECTION

10: FONT DATA CONVERSION SECTION

MULTICOLOR IMAGING FORMING APPARATUS

This application is a continuation of application Ser. No. 339,520, filed Apr. 17, 1989, now abandoned.

BACKGROUND OF THE INVENTION

1. Field of the Invention

The present invention relates to a multicolor image forming apparatus which utilizes an electrophotographic process and, more particularly, to a multicolor image forming apparatus which uses a character font.

2. Description of the Prior Art

In a known image forming apparatus, character data is transferred in the form of code data, and the code data is converted to image data consisting of pixels of 1 to several bits to obtain a visible image.

Data to be referred to in this conversion is called a font. In order to convert the font into image data, special-purpose data conversion means is used.

The conventional image forming apparatus described above forms image data by utilizing a character font, and forms a black-and-white toner image on the basis of the image data. This apparatus cannot record a color character.

If a color character can be recorded in a corresponding color, the recorded character looks fine.

When a color character is recorded, if its density (gradation) can be controlled, a character can be recorded to have a density corresponding to a character color.

Various image forming apparatuses for forming a color image are known. Of these apparatuses, an apparatus described in U.S. Pat. No. 4,679,929 has a simple arrangement, and can achieve a high-speed operation and high image quality as features of the electrophotographic technique. The characteristic feature of this apparatus is formation of toner images color by color in layers on a photosensitive body (image forming body).

Color reproduction in this apparatus is performed by forming a plurality of kinds of toners in layers at an identical position on the photosensitive body or to be adjacent to each other. However, the way of forming image data of a character when a color image is formed by this apparatus is not described.

It is conventionally considered that when a color character is recorded, a black-and-white character font can be used.

However, when a recording apparatus according to an electrophotographic technique described above is used as a recording means, the following problems are posed.

Such a recording apparatus has a drum-like image forming body. After a toner image of a first color is formed on the image forming body, a toner image of a second color is formed on the toner image of the first color to overlap it in the next process. Such an image forming process is performed for all the color-separation images.

When all the image forming processes are completed, fixing and separation processes are performed, so that a color original is copied and recorded on a normal recording paper sheet.

When a recording unit for forming multicolor toner images in layers is used, the toner image of the first color has a different amount of attached toner from that of the toner image of the second color, thus impairing color reproduction characteristics, as will be described in detail later.

If font data can be selected according to a user's favor, this results in very convenience.

When yellow, magenta, and cyan toners are used, a green character is obtained by overlapping yellow and cyan toners on the image forming body.

When a multicolor toner image is formed by overlapping color toners, the overlying toner layer is not easily attached to the underlying toner layer, or a peripheral portion of a character is blurred, thus degrading color reproduction characteristics and recording quality, as will be described in detail later.

SUMMARY OF THE INVENTION

It is a first object of the present invention to provide a multicolor image forming apparatus which can perform color recording using a font.

It is a second object of the present invention to provide a multicolor image forming apparatus which can perform color recording using a font and can improve color reproduction characteristics.

It is a third object of the present invention to provide a color image forming apparatus which can improve quality of a color character.

It is a fourth object of the present invention to provide a color image forming apparatus which can control a density, and can improve quality of a color character.

In order to achieve the above objects, a basic circuit arrangement according to the present invention comprises: image input means for outputting data of at least a character, a size of the character, and coordinates of the character on a screen as image code data on the basis of input image data, a font storage section for storing font data and outputting the font data in accordance with an input address signal, a font data conversion section having a function of converting the image code data into image data consisting of pixel data on the basis of the font data, and an image buffer memory for temporarily storing the image data output from the font data conversion section. With this arrangement, toner images are frame-sequentially formed on an image forming body in units of color components on the basis of the obtained image data, thereby forming a multicolor toner image.

A multicolor image forming apparatus according to the present invention incorporates a font, and performs recording of a character and the like by an electrophotographic technique capable of performing high-density recording on the basis of image data formed using the font.

When an input image is a color character image, color-separated image data are frame-sequentially converted to image data with reference to font data in units of color components.

In this manner, toner images are frame-sequentially formed on the image forming body on the basis of the resultant image data in units of color components to sequentially overlap each other, thereby forming a multicolor toner image.

As a result, characters having chromatic colors such as yellow, magenta, cyan, and the like can be printed with high quality as, well as a black character.

DETAILED DESCRIPTION OF THE PREFERRED EMBODIMENTS

An embodiment of a multicolor image forming apparatus according to the present invention will now be described with reference to the accompanying drawings.

Figure 1:
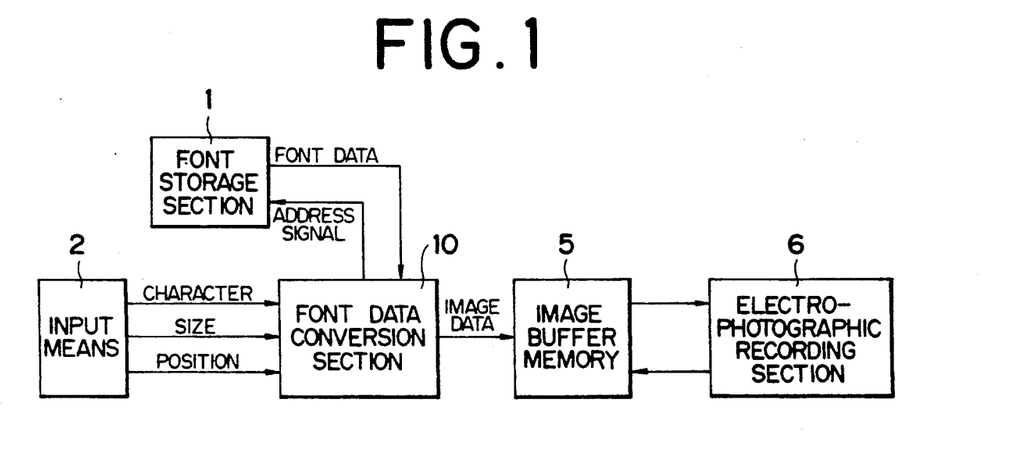
FIG. 1 is a block diagram showing a basic circuit arrangement of a multicolor image forming apparatus according to an embodiment of the present invention.

FIG. 1 is a block diagram showing a basic arrangement of a multicolor image forming apparatus according to an embodiment of the present invention.

In this invention, the image forming apparatus has a font storage section 1 storing fonts of characters, symbols, and the like.

An input means 2 inputs image data to a font data conversion section 10 as a code. The image code data consists of at least character type data, character size data, and character position data (coordinate data).

Of the input image code data, the character data is decoded by the font data conversion section 10, and an address signal is supplied to the font storage section 1 having font data.

In the font storage section 1, font data corresponding to the input address signal is referred to, and is output to the font data conversion section 10.

In the font data conversion section 10, conversion using data representing a character size of the image code data as a parameter is performed, and character image data on a two-dimensional plane is formed.

The character image data is stored in a corresponding area of an image buffer memory 5 in accordance with the position data of the input image code data.

When image data for one frame associated with specific color data is formed, the image data is output from the image buffer memory 5 in accordance with a request signal from an electrophotographic recording section 6.

The electrophotographic recording section 6 forms an electrostatic latent image on the basis of the input image data, and a corresponding color toner is applied to the latent image to develop the latent image.

The processes starting from formation of image data to development are executed in units of colors to form a multicolor toner image. A fixing process is then performed to record (copy) a desired color original.

Figure 2:
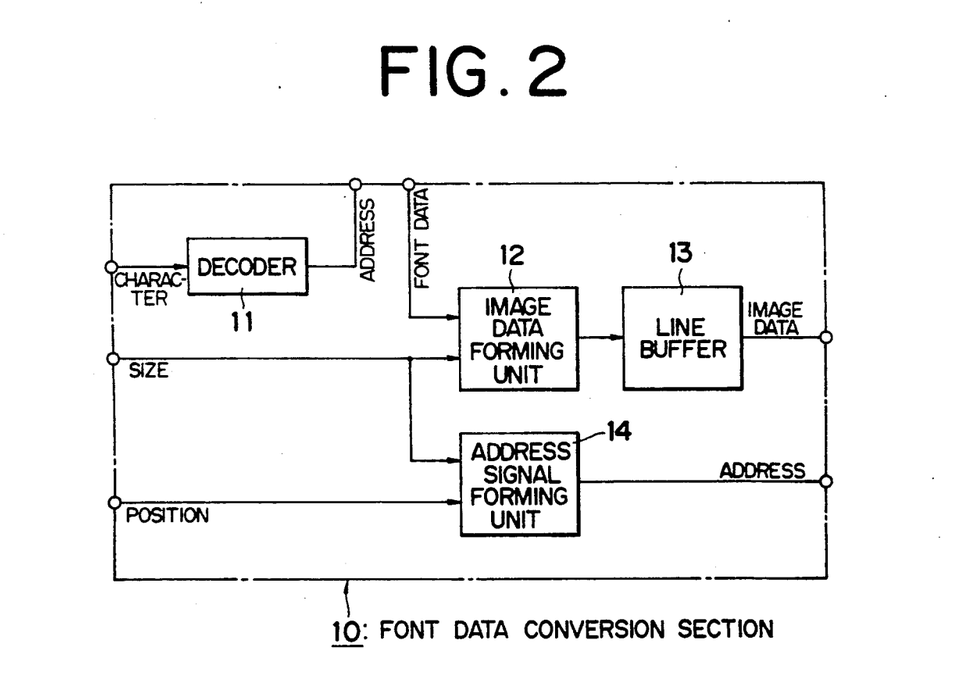
FIG. 2 is a block diagram showing a circuit arrangement of a font data conversion section of the embodiment shown in FIG. 1.

FIG. 2 shows an arrangement of the font data conversion section 10 described above.

Character data constituting the image code data is decoded by a decoder 11 to form an address signal for the font storage section 1.

A character font corresponding to the character is referred to on the basis of the formed address signal, and is output to an image data forming unit 12.

In the image data forming unit 12, character image data corresponding to an input character size is formed in accordance with the input font and input character size data, and is sent to a line buffer 13.

The image code data indicating the character size is also supplied to an address signal forming unit 14. The address signal forming unit 14 also receives image code data representing character position data. The unit 14 forms an address signal indicating a recording position (coordinate position) in accordance with these data.

Figure 3:
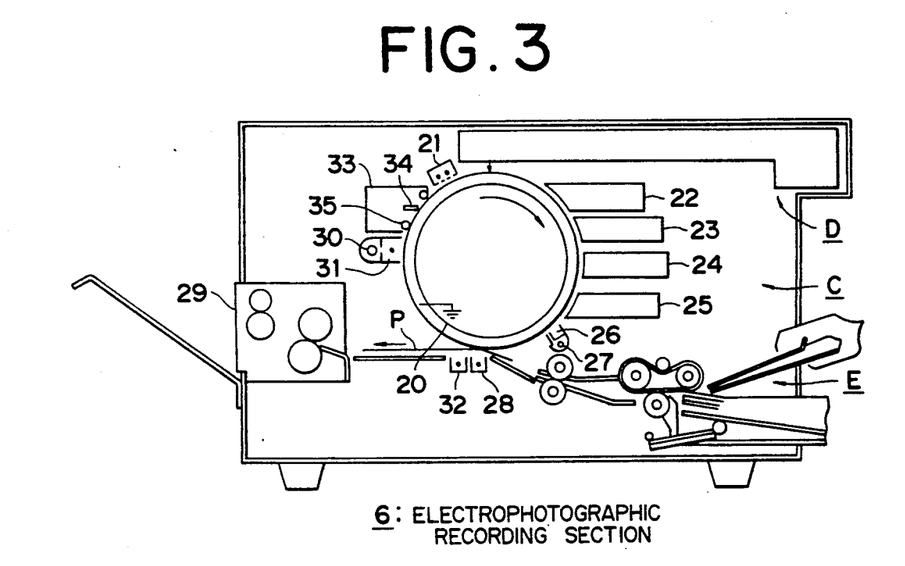
FIG. 3 is a schematic sectional view of an electrophotographic recording section of the embodiment shown in FIG. 1.

The address signal and the image data in the line buffer 13 are output in correspondence with each other, so that the image data is stored in an area in the image buffer memory 5 designated by the address signal. FIG. 3 shows the electrophotographic recording section 6. As the electrophotographic recording section 6, a color copying machine using a drum-like image forming body can be used.

In FIG. 3, reference numeral 20 denotes an image forming body having a photoconductive photosensitive surface layer of, e.g., OPC, Se, or the like. The image forming body 20 is rotated in a direction of an arrow in FIG. 3.

Reference numeral 21 denotes a charger for uniformly charging the surface of the image forming body 20. The image forming body 20 is subjected to image exposure of color images in units of colors by a write unit D.

Reference numerals 22 to 25 denote developing units using toners of different colors such as yellow, magenta, cyan, and black as developing agents. Reference numerals and 27 respectively denote a pre-transfer charger and a pre-transfer exposure lamp which are arranged to facilitate transfer of a multicolor toner image formed by overlaying a plurality of color toner images on the image forming body onto a recording sheet (transfer material) P or separation of the recording sheet P, as needed.

Reference numeral 28 denotes a transfer unit for transferring a multicolor toner image; 29, a fixing unit for fixing the multicolor image transferred onto the recording sheet P; and 30 and 31, a discharging lamp and a corona discharger, respectively. One or both of the discharging lamp 30 and the corona discharger 31 are combined and used.

Reference numeral 32 denotes a separation discharging electrode; and 33, a cleaning device which is brought into contact with the surface of the image forming body 20 so as to remove a residual toner on the surface after the color image is transferred. The cleaning device 33 has a cleaning blade 34 and a fur brush 35 which are separated from the surface of the image forming body 20 until a surface portion subjected to a first development is reached.

Since the charger 21 charges the already charged surface of the image forming body 20, a scorotron corona discharger shown in FIG. 3 is preferably used since it is less influenced by previous charging and can provide stable charging.

A multicolor image formation process using the electrophotographic recording section 6 will be described below with reference to FIG. 4.

Since the image forming body 20 has the photoconductive layer on an electrically conductive substrate, a latent image forming means is constituted by a combination of the charger 21 for uniformly charging the surface of the image forming body 20, and an image exposure device D for radiating a light beam such as a laser beam on the surface of the image forming body 20 to perform image exposure.

Figure 4:
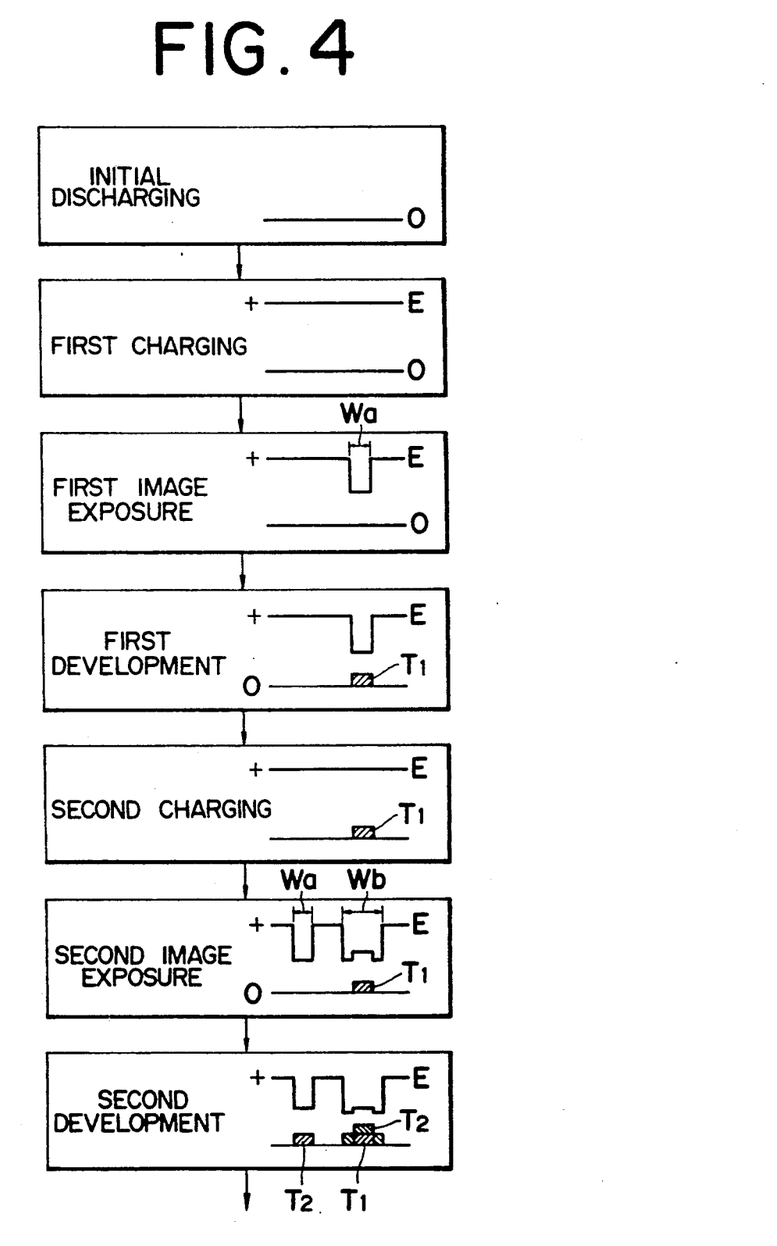
FIG. 4 is a chart showing an electrophotographic image forming process.

FIG. 4 shows a change in surface potential of the image forming body 20. T1 indicates a toner image developed in a first process, and T2 indicates a toner image developed in a second process. For the sake of descriptive convenience, the polarity of a latent image is positive.

1. The image forming body 20 is uniformly charged by the charger 21 to have a surface potential E.

2. Image exposure of a first color is performed by the image exposure device D, and a potential of the exposed portion is decreased in accordance with an amount of radiated light. In this manner, an electrostatic latent image is formed.

3. The latent image is developed by one of the developing units 22 to 25 applied with a positive bias almost equal to the surface potential E of the unexposed portion.

As a result, a toner (T1) having a positive charge is attached to a portion (exposed portion) having a relatively low potential, thus forming the toner image T1 of a first color.

4. The image forming body 20 is uniformly charged by the charger 21 while the toner image is left attached to its surface, and the surface potential of the image forming body 20 becomes E regardless of the presence/absence of the toner.

5. Image exposure of a second color is performed by the image exposure device D, and a potential of the exposed portion is decreased in accordance with an amount of radiated light. In this manner, an electrostatic latent image is formed.

When a region to which the toner is attached in the developing process of the first color is exposed again, it has a potential almost equal to a potential after development.

6. The latent image is developed by a toner of a different color from the toner of the first color as in item 3. As a result, toner images T1 and T2 of two colors are obtained on the image forming body 20.

A similar process is repeated a required number of times to obtain a multicolor toner image on the image forming body 20. Thereafter, the fixing/separation process is performed, so that a color original image is recorded on the recording sheet P.

Note that when the recording section (multicolor printer) 6 described with reference to FIGS. 3 and 4 is used, the advantage of the electrophotographic technique, i.e., high-speed operation and high resolution can be utilized, and its arrangement can be simplified and easily rendered compact.

Figure 5:
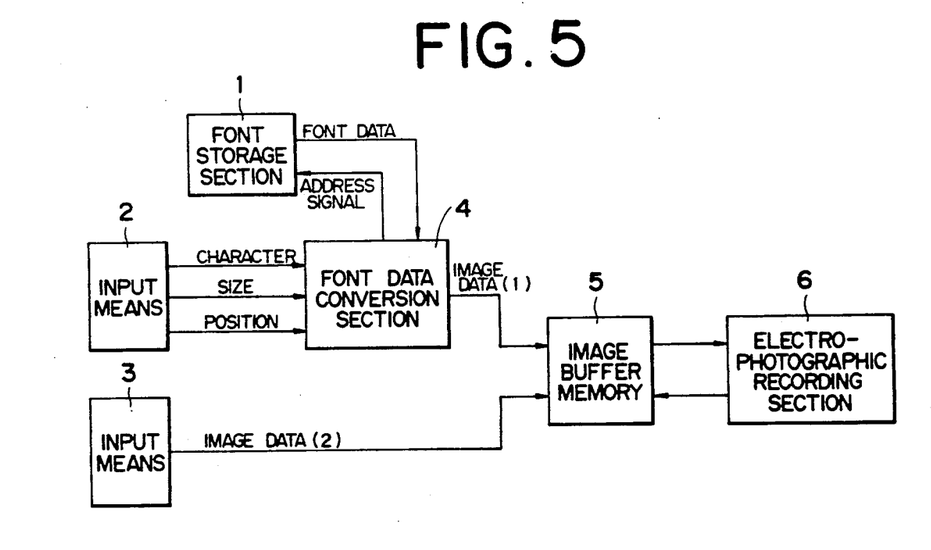
FIG. 5 is a block diagram showing a circuit arrangement of a multicolor image forming apparatus according to another embodiment of the present invention.

FIG. 5 shows another embodiment of a multicolor image forming apparatus according to the present invention.

In this embodiment, two or more images are synthesized in an image buffer memory 5. For this purpose, a second input means 3 is arranged.

Image data having a format to be stored in the image buffer memory 5 is transferred from the second input means 3, and is synthesized with image data input by a first input means 2. The second input means 3 comprises, e.g., a scanner for scanning an original by a solid-state image pickup element. The scanner can input an arbitrary image such as a photograph or a graphic image. Since other arrangements are the same as those in the embodiment shown in FIG. 1, the same reference numerals denote the same parts, and a detailed description thereof is omitted.

According to this embodiment, a synthesized image of a character or symbol with a photograph or graphic image can be formed.

Figure 6:
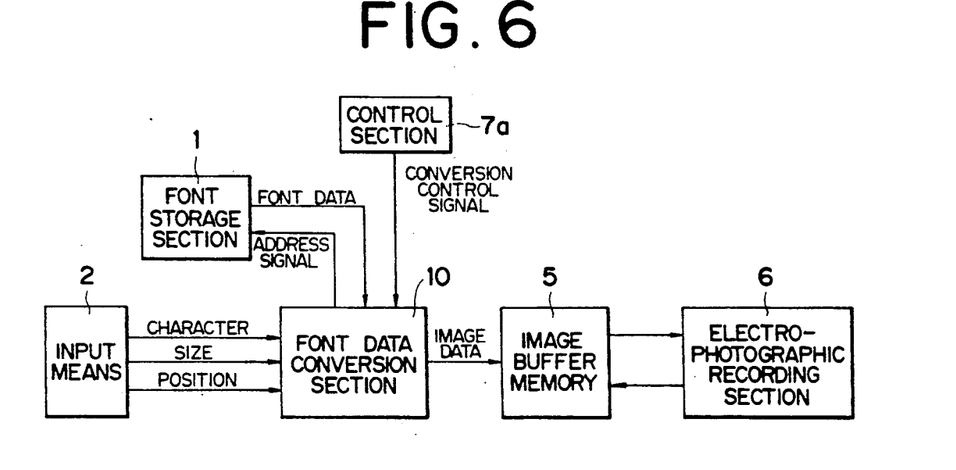
FIG. 6 is a block diagram showing a circuit arrangement of a multicolor image forming apparatus according to still another embodiment of the present invention.

FIG. 6 is a block diagram showing still another embodiment of an image forming apparatus according to the present invention, which can change a conversion method from an image code to image data by an external control signal. A control section 7a generates a conversion control signal.

As the conversion control signal, a character size or color designation signal obtained by key inputs can be used. Since other arrangements are the same as those in the embodiment shown in FIG. 1, a repetitive description is avoided.

Figure 7:
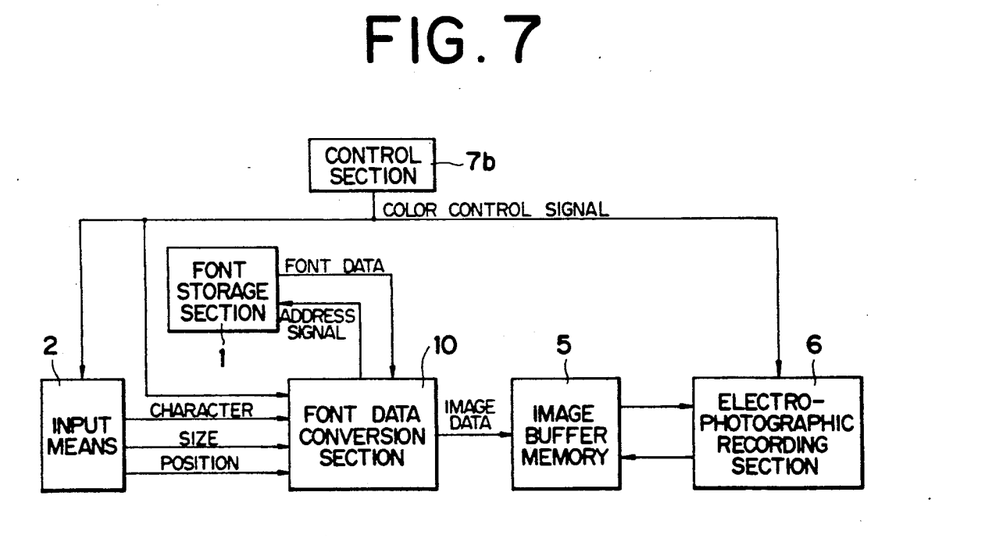
FIG. 7 is a block diagram showing a circuit arrangement of a multicolor image forming apparatus according to still another embodiment of the present invention.

FIG. 7 shows still another embodiment of a multicolor image forming apparatus according to the present invention. This embodiment corresponds to an application of the embodiment shown in FIG. 6. In this embodiment, a color control signal is used as a control signal, and is input to an input means 2, a font data conversion section 10, and an electrophotographic recording section 6.

The electrophotographic recording section 6 frame-sequentially performs image formation in units of colors. A control section 7b instructs input of an image and conversion to image data in correspondence with the colors.

The font data conversion section 10 performs processing of increasing a width of a character in the order of, e.g., yellow, magenta, cyan, and black in correspondence with a color of an image to be formed.

The width of a character is varied in correspondence with a color to be recorded for the following reason.

When a multicolor toner image is formed by overlaying color toners as described above and when the photosensitive layer is converted to an electrically conductive layer by image exposure upon formation of the latent image of the second color, the following problems are posed:

1. a laser beam is partially absorbed by the toner image of the first color; and 2. a charge of the toner cannot be erased by light radiation.

The cause of item 1. is that an essential exposure amount reaching the photosensitive layer is reduced, and a charge on the photosensitive layer cannot be satisfactorily erased. As a result, the surface potential of the photosensitive body cannot be sufficiently decreased.

The cause of item 2. is that the charge of the toner cannot be erased by exposure unless the toner is a special one having a photoconductive property. Therefore, this also disturbs a decrease in surface potential of the photosensitive body.

For these reasons, a surface potential difference between the exposed and unexposed portions on a region where a toner image is formed becomes small, and a latent image cannot be developed by a sufficient amount of toner.

More specifically, when toners are overlaid to reproduce a color, an amount of attached toner of the second color or thereafter is reduced, and amounts of attached toners are unbalanced. Therefore, a color reproduction range is narrowed. The above two causes depend on the developing order of toners, spectral characteristics of an image exposure beam (laser beam), spectral characteristics of toners, a charge amount of toner, and the like, and color reproduction characteristics vary depending on these parameters.

Since these tendencies become stronger in the order of yellow, magenta, cyan, and black, if the width of a character is increased in this order, the above-mentioned influence can be eliminated, thus avoiding degradation of color reproduction characteristics.

Figure 8:
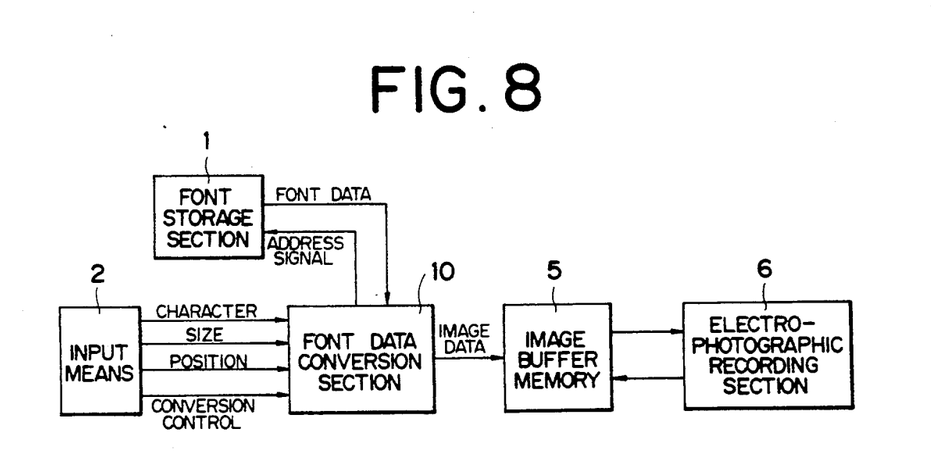
FIG. 8 is a block diagram showing a circuit arrangement of a multicolor image forming apparatus according to still another embodiment of the present invention.

FIG. 8 shows still another embodiment of a multicolor image forming apparatus according to the present invention. In this embodiment, image code data includes character color data in addition to the character, character size, and position data described above. As the color data, each character has color data of one of 7 colors.

Therefore, in this embodiment, color character data can be transferred not as color-separated data. In this case, a font data conversion section 10 fetches input color data, and image code data associated with a color of an image to be formed next by an electrophotographic recording section 6 is converted to image data in the same manner as in the processing of FIG. 1.

For example, a green character is converted to image data when an image formation process corresponds to yellow and cyan. In this case, since a multicolor image is formed by overlaying color toners, the font data conversion section 10 can preferably change a conversion method in accordance with this color data.

For example, color requiring a cyan toner during image formation are cyan, blue, green, and the like, and corresponding image data are formed by changing, e.g., parameters. The image data is converted such that a line width of a character is reduced or an amount of attached toner is reduced in the order of cyan, blue, and green.

Figure 9:
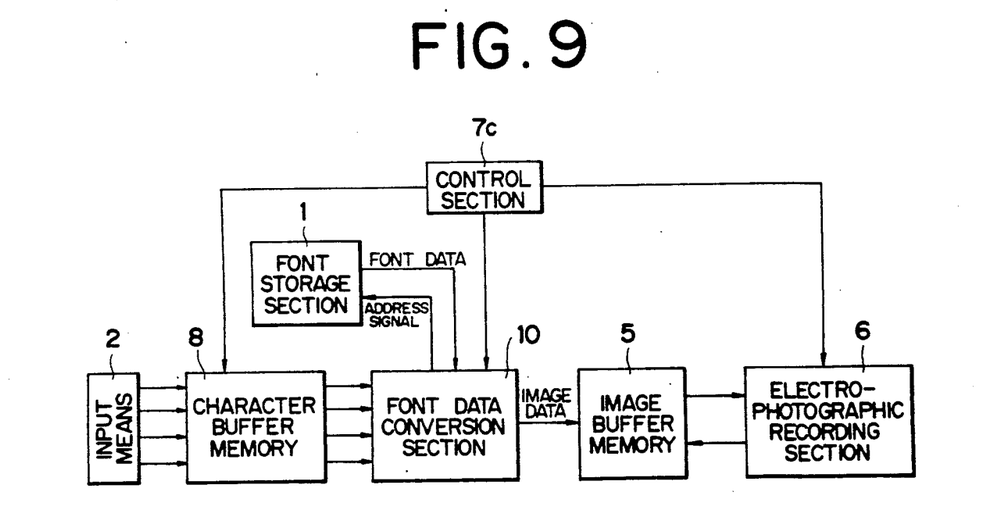
FIG. 9 is a block diagram showing a circuit arrangement of a multicolor image forming apparatus according to still another embodiment of the present invention.

FIG. 9 shows an extended embodiment of the embodiment shown in FIG. 8. In this embodiment, a character buffer memory 8 for storing an image code input from an input means 2 is controlled by a control section 7c arranged between the input means 2 and a font data conversion section 10.

In this case, a character of a color (yellow, red, or green) requiring a yellow toner is first read out from the character buffer memory 8, and is converted to image data. Next, a character of a color (magenta, red, or blue) requiring a magenta toner is read out from the character buffer memory 8 and is converted to image data. Similarly, image data are frame-sequentially transferred to an image buffer memory 5.

Figure 10:
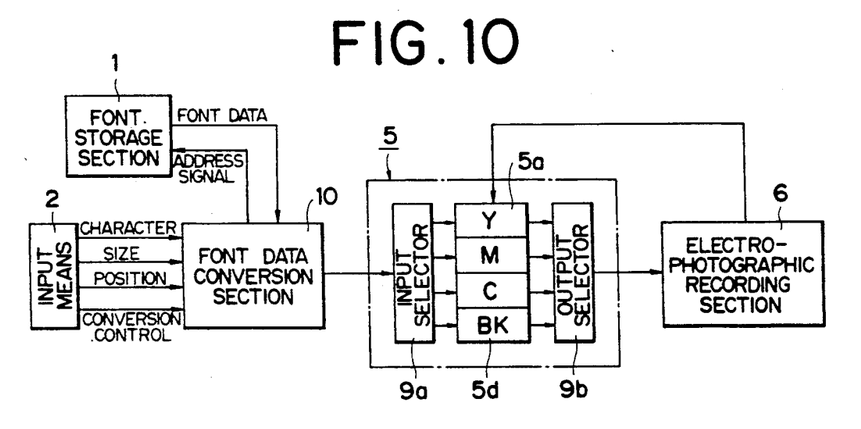
FIG. 10 is a block diagram showing a circuit arrangement of a multicolor image forming apparatus according to still another embodiment of the present invention.

An embodiment shown in FIG. 10 is an extended one of the embodiment shown in FIG. 8. In this embodiment, an image buffer memory 5 has storage areas 5a to 5d corresponding to image formation colors (yellow, magenta, cyan, and black) of an electrophotographic recording section 6.

With this arrangement, even if a character code input from an input means 2 has any color data, image data corresponding to a toner required for forming the color can be formed. In this embodiment, reference numeral 9a denotes an input selector; and 9b, an output selector. Other arrangements are the same as those in FIG. 8.

Figure 11:
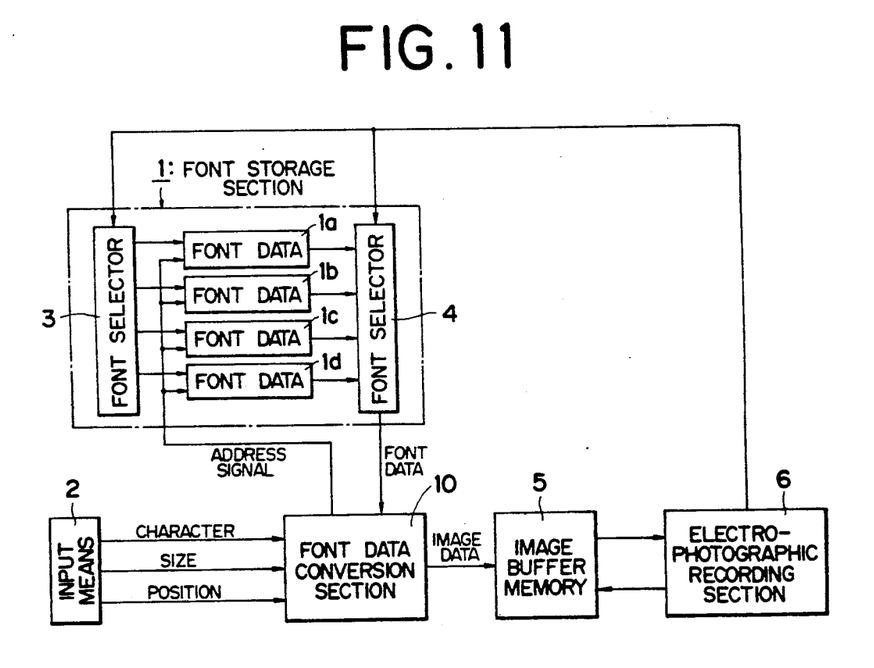
FIG. 11 is a block diagram showing a circuit arrangement of a multicolor image forming apparatus according to still another embodiment of the present invention.

FIG. 11 is a block diagram showing still another embodiment of a multicolor image forming apparatus according to the present invention. The same reference numerals in FIG. 11 denote the same parts as in FIG. 1, and a detailed description thereof will be omitted.

In this embodiment, a font storage section 1 stores a plurality of kinds of font data, which are automatically selected in accordance with a recording sequence of an electrophotographic recording section 6.

In this embodiment, fonts corresponding in number to recording colors are prepared. As will be described later, when color recording is performed using four colors of yellow, magenta, cyan, and black, font data storage blocks 1a to 1d are arranged in the storage section 1, and commonly receive an address signal. Font selectors 3 and 4 are connected to input and output stages of the blocks 1a to 1d.

The font selectors 3 and 4 are controlled by a sequence signal indicating a recording color order in the recording section 6, so that font data corresponding to a recording color is selected.

Figure 12:
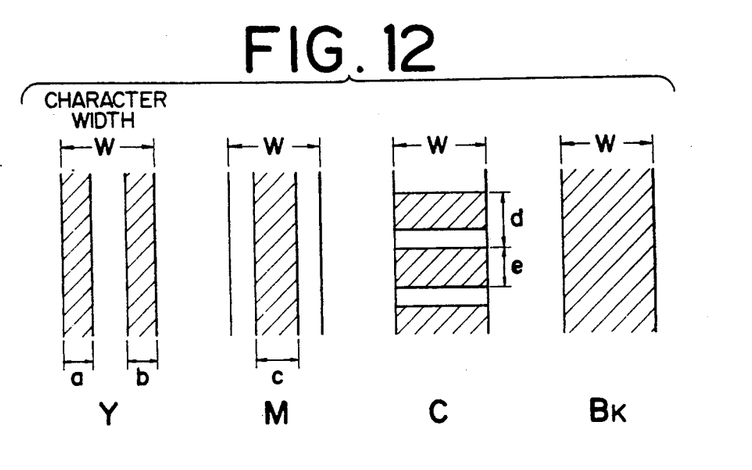
FIG. 12 is a view showing examples of images recorded on the basis of different font data in the embodiment shown in FIG. 11.

FIG. 12 shows examples of font data stored in the font storage section 1. Depending on colors to be recorded, fonts having different recording shapes or recording widths are used although a line width W remains the same.

For example, as shown in FIG. 12, a yellow font Y is formed as one in which only edge portions a and b of the line width W are recorded. A magenta font M is formed as one in which only a central portion c is recorded.

a cyan font C is constituted by lateral stripes each having a predetermined width e and a predetermined pitch d. In contrast to this, a black font BK is formed as one which is recorded to have the line width W.

The widths are recording shapes are varied depending on colors to be recorded although the line width W remains the same for the same reason as described in the embodiment shown in FIG. 7.

Since the above-mentioned tendencies become stronger in the order of yellow, magenta, cyan, and black, the width of a character is decreased or its recording shape is varied in this order, so that the above-mentioned influence can be eliminated.

When a character is constituted using font data recorded as shown in FIG. 12, a portion where toners overlap each other and a portion where no toners overlap always appear at a specific rate, thus minimizing a change in amount of attached toner depending on colors.

When such font data are used, degradation of color reproduction characteristics can be prevented.

Thus, the line widths and recording shapes shown in FIG. 12 are merely examples, and the contents of fonts are not limited as long as they can improve color reproduction characteristics.

The arrangement of the font data conversion section 10 of this embodiment is the same as that shown in FIG. 2. In order to select specific font data, a copy sequence signal of the recording section 6 is referred to, as shown in FIG. 11.

Figure 13:
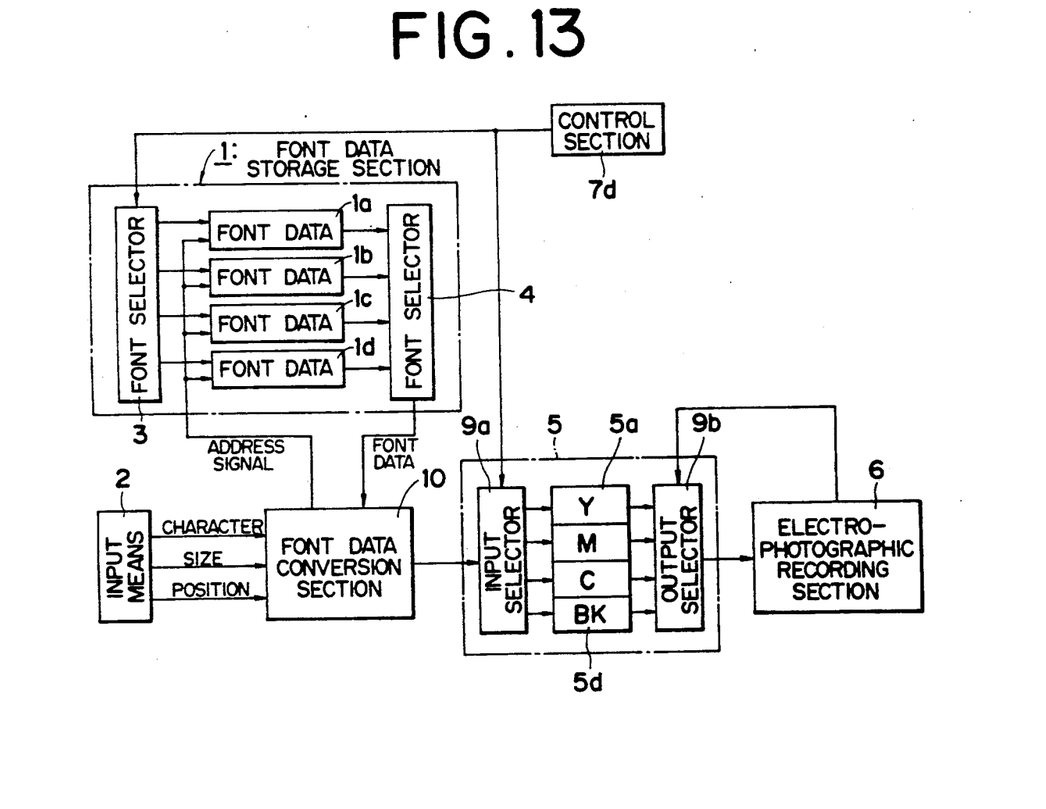
FIG. 13 is a block diagram showing a circuit arrangement of a multicolor image forming apparatus according to still another embodiment of the present invention.

FIG. 13 shows still another embodiment of a multicolor image forming apparatus according to the present invention. This embodiment is similar to that in FIG. 11.

In this embodiment, a user can select an arbitrary type of font.

The arbitrary type means types such as the Gothic type, Ming type, and the like.

For this purpose, four kinds of font data having different types are stored in corresponding blocks 1a to 1d.

An image buffer memory 5 has storage areas 5a to 5d corresponding to the blocks 1a to 1d and image formation colors (yellow, magenta, cyan, and black) of an electrophotographic recording section 6. An input selector 9a is connected to input stages of the areas 5a to 5d and an output selector 9b is connected to their output stages.

The input selector 9a and font selectors 3 and 4 are selected by a type selection signal from a control section 7d. Thus, a font according to a users' favor can be selected.

The output selector 9b is selected in accordance with a copy sequence signal from the recording section 6.

Figure 14:
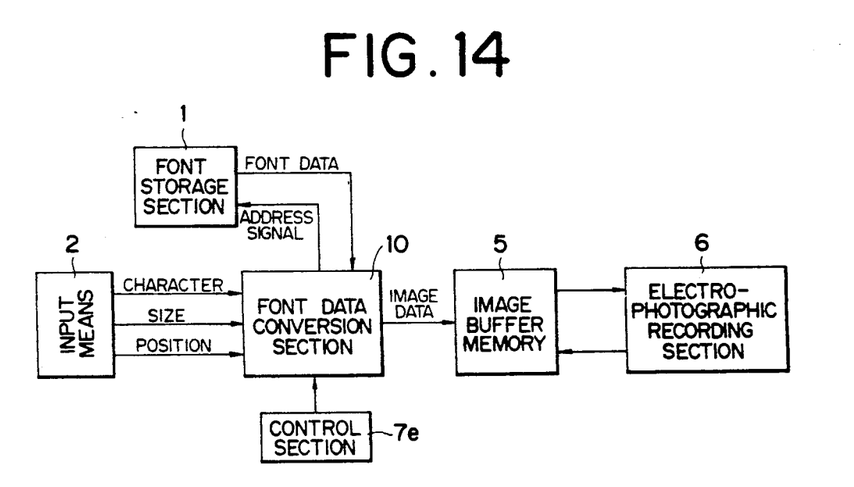
FIG. 14 is a block diagram showing a circuit arrangement of a multicolor image forming apparatus according to still another embodiment of the present invention.

FIG. 14 is a block diagram showing still another embodiment of a multicolor image forming apparatus according to the present invention.

The circuit arrangement of this embodiment is very similar to that in the embodiment shown in FIG. 6, except that the control section 7a shown in FIG. 6 outputs a conversion control signal for designating a character size or color, while a control section 7e for controlling a line width is arranged in this embodiment.

Therefore, the circuit operation of this embodiment is substantially the same as that of the embodiment in FIG. 6 described above, except that image size and line width data which are formed on the basis of character size data input at an input means 2 and a line width control signal from the control section 7e are desirably controlled in an image formation order.

A font storage section 1 can store a plurality of kinds of font data associated with character colors. In this case, these font data are automatically selected in accordance with input color data.

As the font data, four kinds of font data of yellow, magenta, cyan, and black corresponding to recording colors are used.

When a multicolor toner image is formed by overlaying color toner images, color misregistration may occur or amounts of attached toner of the second color and thereafter may be decreased and unbalanced, resulting in a narrow color reproduction range.

In this embodiment, a line width to be recorded is controlled in accordance with a character color. More specifically, a line width of at least an overlying image is larger than that of a recorded image formed before the overlying image.

For example, a green character is obtained by overlapping yellow and cyan images. In this case, when toner images are formed in this order, if the line width of the yellow image is assumed to be a standard line width Wa, the line width of the cyan image is selected to be Wb larger than the width Wa.

Since the cyan toner image is attached while it does not partially overlap the yellow toner image, the amounts of attached toners of the yellow and cyan toner images are not unbalanced.

For this line width control, a font data conversion section 10 has a line width control means in addition to an image data conversion function.

Figure 15:
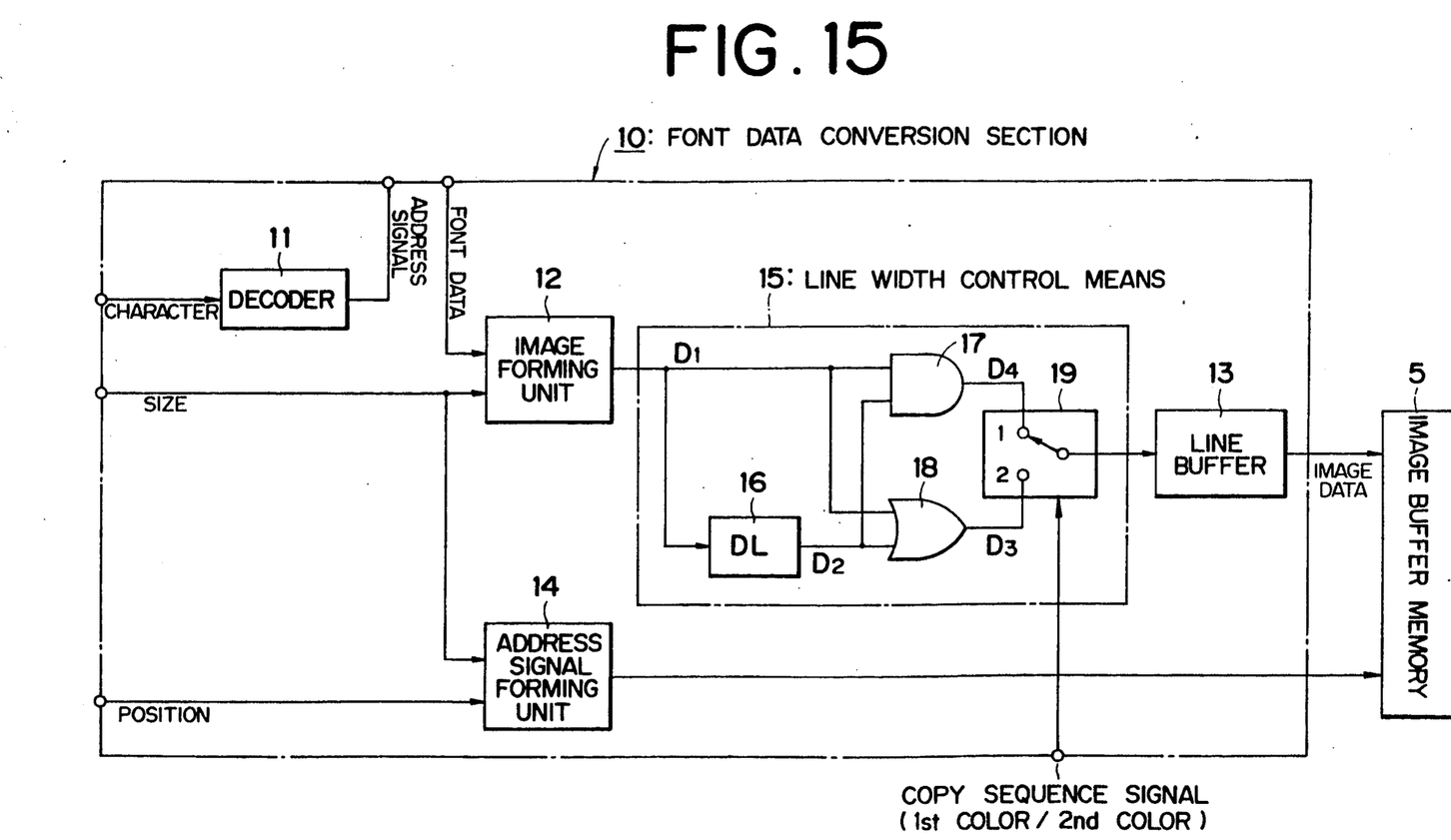
FIG. 15 is a block diagram showing a font data conversion section of the embodiment shown in FIG. 14.

FIG. 15 shows an arrangement of the font data conversion section 10 in the embodiment shown in FIG. 14.

Character data constituting image code data is decoded by a decoder 11 to form an address signal for the font storage section 1.

Corresponding font data is accessed by the address signal, and is sent to an image data forming unit 12.

The image data forming unit 12 forms character image data corresponding to an input character size in accordance with the input font data and input character size data, and supplies it to a line width control means 15.

The line width control means 15 has a delay element 16, having a predetermined delay amount, for controlling a line width. A delayed output D2 obtained by the delay element 16 and a non-delayed output (input signal) D1 are commonly supplied to an AND gate 17 and an OR gate 18.

Figure 16:
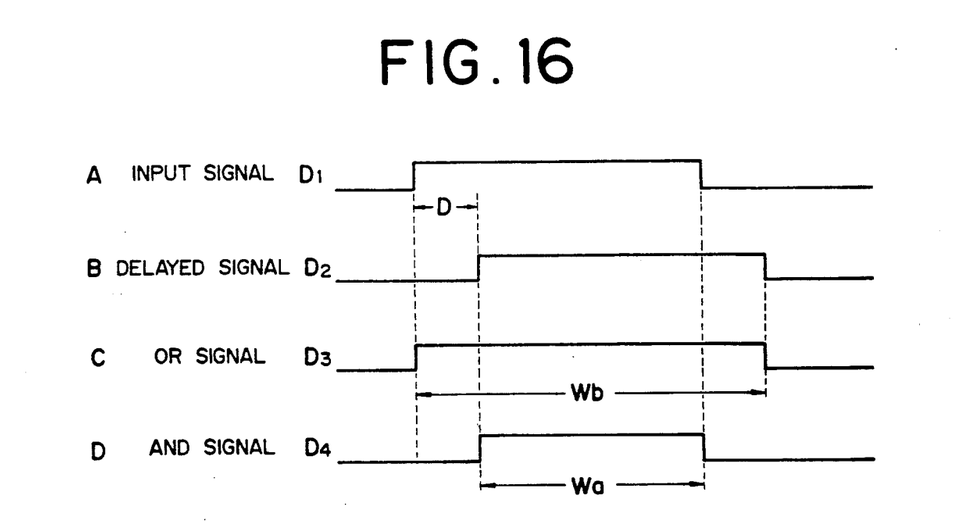
FIG. 16 is a waveform chart for explaining line width control of the embodiment shown in FIG. 14.

When the non-delayed output D1 is as shown in FIG. 16 and the delay amount of the delay element 16 is D, an AND output D4 and an OR output D3 shown in C and D in FIG. 16 are obtained.

The OR output D3 is image data for obtaining a line width Wb, which is larger than that of the input signal by D. In contrast to this, the AND output D4 is image data for obtaining a line width Wa, which is smaller than that of the input signal by D.

One of the AND output D4 and the OR output D3 is selected by a switching means 19, and is supplied to a line buffer 13.

The switching means 19 is controlled by a copy sequence signal indicating a recording color order of an electrophotographic recording section 6 (to be described later).

For example, a green character is obtained by overlapping yellow and cyan images. In this case, when toner images are formed in this order, the AND output D4 is selected in a yellow copy sequence, and the OR output D3 is selected in the next cyan copy sequence.

As shown in FIG. 4, the cyan line width Wb is larger than the yellow line width Wa.

Since the cyan toner image is attached while it does not partially overlap the yellow toner image, the amounts of attached toners of the yellow and cyan toner images are not unbalanced.

When the copy sequence is opposite to that described above, control is made such that the yellow toner image has a larger line width than that of the cyan image.

The image code data indicating the character size is also supplied to an address signal forming unit 14.

The address signal forming unit 14 also receives image code data representing character position data, and forms an address signal indicating a recording position (two-dimensional coordinates) on the basis of these data.

The address signal and image data in the line buffer 13 are output in correspondence with each other, so that the image data is stored in an area of the image buffer memory 5 designated by the address signal.

In this embodiment, a line width of a character to be recorded is controlled in accordance with a character color so as to prevent color misregistration or a narrow color reproduction range. A density of a character to be recorded may be controlled to prevent color misregistration or a narrow color reproduction range.

This embodiment has the same circuit arrangement as that in the embodiment shown in FIG. 14. In this embodiment, a density of at least an overlying image is higher than that of a recorded image formed before the overlying image.

Figure 18:
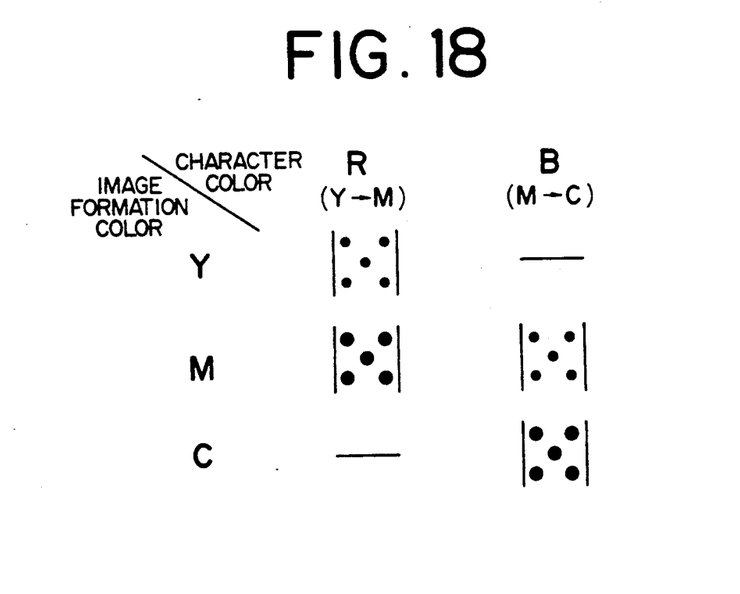
FIGS. 18 and 19 are waveform charts for explaining density control in the font data conversion section shown in FIG. 17.

For example, a red character is obtained by overlapping yellow and magenta images. In this case, when toner images are formed in this order, control is made such that the density of a magenta image M as a second color image is higher than that of a yellow image, as shown in FIG. 18.

When a blue image B is recorded, a cyan image C as a second color image is recorded to have a higher density than that of a magenta image M.

In this manner, the amount of attached toner of the second toner image is no longer smaller than that of the first color image.

Figure 17:
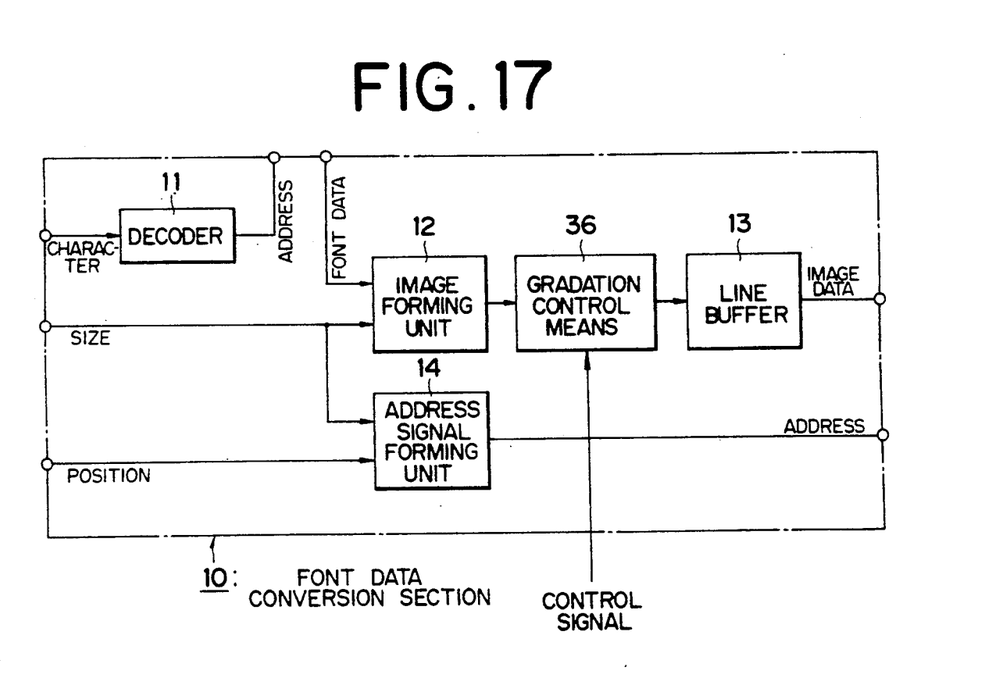
FIG. 17 is a block diagram showing a circuit arrangement of a font data conversion section according to still another embodiment of the present invention.

FIG. 17 shows a circuit arrangement of the font data conversion section 10 used in the multicolor image forming apparatus for performing such density control.

Character data constituting image code data is decoded by a decoder 11 to form an address signal for the font storage section 1.

Corresponding font data is accessed by the address signal, and is sent to an image data forming unit 12.

The image data forming unit 12 forms character image data corresponding to an input character size in accordance with the input font data and input character size data, and supplies it to a density control means, i.e., a gradation control means 36 in this embodiment.

The gradation control means 36 converts image data into one indicating a specific gradation level in accordance with a control signal. As the gradation level, 6 to 8 gradation levels can be selected.

Simultaneously with the gradation control, the density of a toner image is desirably selected in the recording order.

Figure 19:
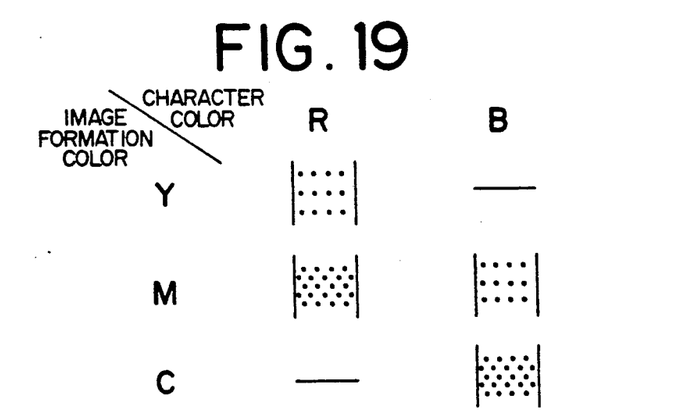

FIGS. 18 and 19 are views for explaining density control.

FIG. 18 shows a case wherein a density difference is provided by changing the size of a dot.

As described above, the red character is obtained by overlapping the yellow and magenta images. In this case, when toner images are formed in the order of yellow and magenta, control is made such that a magenta image as a second color image has a larger dot than that of a yellow image.

Similarly, when a blue image as a combination of magenta and cyan is recorded, control is made such that a cyan image as the second color image has a larger dot than that of a magenta image.

As the control signal therefor, a copy sequence signal indicating a recording color order of the electrophotographic recording section 6 can be used.

FIG. 19 shows a case wherein when the same character color as in FIG. 18 is obtained, a density difference is obtained by changing the number of dots.

Simultaneously with density difference control, the above-mentioned gradation control is executed in response to a control signal from the control section 7e.

The image code data indicating the character size is also supplied to an address signal forming unit 14.

The address signal forming unit 14 also receives image code data representing character position data, and forms an address signal indicating a recording position (two-dimensional coordinates) on the basis of these data.

The address signal and image data in the line buffer 13 are output in correspondence with each other, so that the image data is stored in an area of an image buffer memory 5 designated by the address signal.

Figure 20:
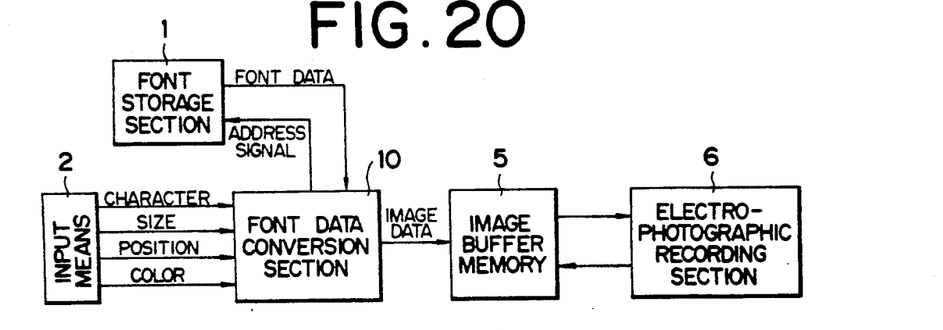
FIG. 20 is a block diagram showing a circuit arrangement of a multicolor image forming apparatus according to still another of the present invention.

FIG. 20 is a block diagram showing still another embodiment of a multicolor image forming apparatus according to the present invention.

The circuit arrangement of this embodiment is similar to that in the embodiment shown in FIG. 1. In this embodiment, image code data supplied from an input means 2 includes character code data, and this color data can be used in place of the copy sequence signal in FIG. 15. Since other circuit arrangements are the same as those in the first embodiment, the same reference numerals in this embodiment denote the same parts as in the embodiment shown in FIG. 1, and a detailed description thereof will be omitted.

Figure 21:
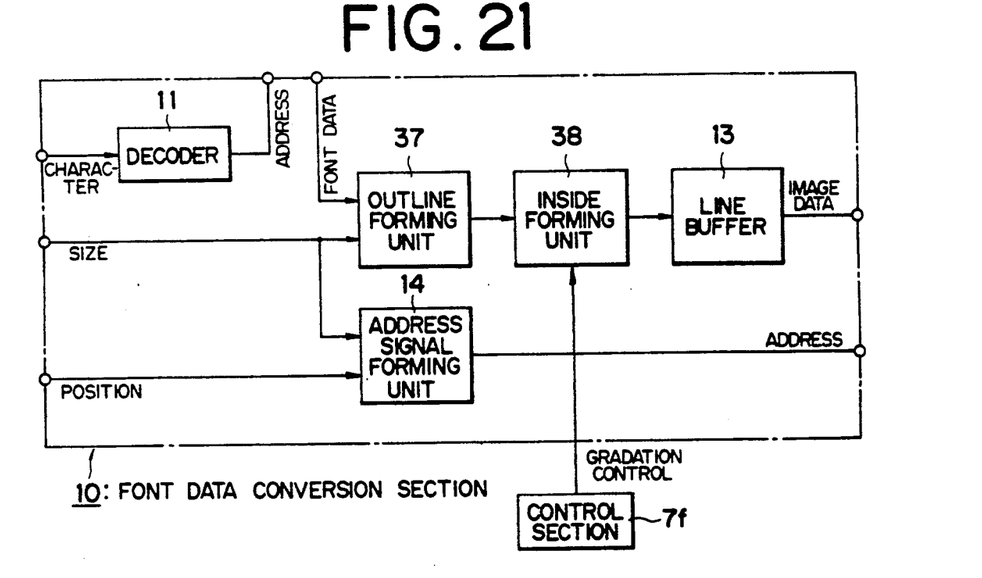
FIG. 21 is a block diagram showing a circuit arrangement of a font data conversion section using outline font data shown in FIG. 20.

FIG. 21 shows a font data conversion section 10 which uses color data included in image code data sent from an input means 2 in place of a copy sequence signal of the embodiment for controlling the density difference in the same circuit arrangement as in FIG. 20.

As a character font, outline font data can be used.

The outline font data expresses an outline of a character by a combination of curves and straight lines, and can guarantee fine quality regardless of a character size.

When the outline font data is used, the image data forming unit 12 shown in FIG. 17 serves as an outline image data forming unit 37, and the gradation control means 36 in FIG. 17 serves as an inside image data forming unit 38 having a gradation conversion function.

The outline image data forming unit 37 forms image data indicating an outline on the basis of the outline font data. The inside image data forming unit 38 forms inner image data for filling the inside of the formed outline image data with data indicating a predetermined gradation level, and is gradation-controlled by a control section 7f.

In this manner, predetermined gradation control can be made using the outline font data, and density control can also be performed.

The embodiments of the present invention have been described. However, the present invention is not limited to these embodiments, and various modifications may be made. For example, a memory of the font storage section may be detachably arranged, and can be replaced in accordance with a user's choice. Font data may be selected in accordance with the order of recording of color images.

What we claim is:

1. A multicolor image forming apparatus for electrophotography, which apparatus does not include a transfer drum, comprising:

image input means for outputting image code data having character data based on input image data;

font storage means for storing font data therein;

font data conversion means for converting the image code data into image data so as to vary a ratio of a plurality of different color toners superposed on each other according to a designated color, wherein the font data conversion means includes:

means for outputting address signal data corresponding to the character data to the font storage means to select the font data stored in the font storage means;

means for controlling a dimension of a character as a result of the superposed color toners; and means for generating the image data based on the selected font data and a recording color corresponding to the designated color;

an image forming body for bearing a latent image;

charging means for charging the image forming body;

exposing means for exposing the charged image forming body on the basis of the image data to form the latent image; and developing means for developing the latent image with the different color toners to form multicolor toner images on the image forming body, each of the multicolor toner images corresponding to the different color toners;

wherein the charging means, the exposing means and the developing means are all repeatedly operated for each recording color such that a latent image formation and a development are sequentially repeated on the same image forming body by the charging means, the exposing means and the developing means so as to sequentially for the different color toners images on the same image forming body in units of the recording color on the basis of the image data, thereby forming, on the same image forming body, the multicolor toner images comprised of the superposed color toners on the basis of the font data and the designated color; and means for transferring the superposed multicolor image, formed on said same image forming body, from said image forming body to a recording medium.

2. The apparatus of claim 1, wherein the font storage means includes means for storing a plurality of kinds of font data in units of the recording color.

3. The apparatus of claim 1, wherein the font data conversion means comprises means for controlling a density of the multicolor toner images.

4. The apparatus of claim 1, wherein the controlling means of said font data conversion means comprises means for controlling a line width in accordance with the recording color.

5. A multicolor image forming apparatus for electrophotography comprising:

image input means for outputting image code data having character data based on input image data;

font storage means for storing font data therein;

font data conversion means for converting the image code data into image data so as to vary a ratio of a plurality of different color toners superposed on each other according to an order of a recording color, wherein the font data conversion means includes:

means for outputting address signal data corresponding to the character data to the font storage means to select the font data stored in the font storage means;

means for controlling a dimension of a character as a result of the superposed color toners; and means for generating the image data based on the selected font data and the recording color;

an image forming body for bearing a latent image;

means for charging the image forming body;

means for exposing the charged image forming body on the basis of the image data to form the latent image; and means for developing the latent image with the different color toners to form multicolor toner images on the image forming body, each of the multicolor toner images corresponding to the different color toners;

wherein a latent image formation and a development are repeated by the charging means, the exposing means and the developing means so as to form the multicolor toner images; and wherein the multicolor toner images are sequentially formed on the image forming body in units of the recording color on the basis of the image data thereby forming the multicolor toner images composed of the superposed color toners on the basis of the font data and the order of the recording color.

6. The apparatus of claim 5, wherein the font storage means includes means for storing a plurality of kinds of font data in units of the recording color.

7. The apparatus of claim 5, wherein the font data conversion means comprises means for controlling a density of the multicolor toner images.

8. The apparatus of claim 5, wherein the controlling means of said font data conversion means comprises means for controlling a line width in accordance with the recording color.

* * * * *